United States Patent
Azar et al.

(10) Patent No.: US 11,909,260 B2
(45) Date of Patent: Feb. 20, 2024

(54) COIL FORMATION IN AN ELECTRIC MACHINE WITH CONCENTRATED WINDINGS

(71) Applicant: Siemens Gamesa Renewable Energy A/S, Brande (DK)

(72) Inventors: Ziad Azar, Sheffield (GB); Erik Groendahl, Them (DK); Subhra Samanta, Ikast (DK); Arwyn Thomas, Cheshire (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 681 days.

(21) Appl. No.: 17/048,197

(22) PCT Filed: Apr. 3, 2019

(86) PCT No.: PCT/EP2019/058345
§ 371 (c)(1),
(2) Date: Oct. 16, 2020

(87) PCT Pub. No.: WO2019/201595
PCT Pub. Date: Oct. 24, 2019

(65) Prior Publication Data
US 2021/0083533 A1 Mar. 18, 2021

(30) Foreign Application Priority Data
Apr. 18, 2018 (EP) ..................... 18167999

(51) Int. Cl.
*H02K 1/16* (2006.01)
*H02K 3/12* (2006.01)
(Continued)

(52) U.S. Cl.
CPC .......... *H02K 1/165* (2013.01); *H02K 1/2791* (2022.01); *H02K 3/12* (2013.01); *H02K 15/024* (2013.01); *H02K 7/183* (2013.01)

(58) Field of Classification Search
CPC .......... H02K 1/165; H02K 1/187; H02K 1/28
See application file for complete search history.

(56) References Cited

U.S. PATENT DOCUMENTS

2005/0258703 A1* 11/2005 Kouda ..................... H02K 3/28
310/180
2012/0001512 A1 1/2012 Dajaku
(Continued)

FOREIGN PATENT DOCUMENTS

EP 2498381 A1 9/2012

OTHER PUBLICATIONS

European Search Report dated Oct. 4, 2018 for Application No. 18 167 999.4.
(Continued)

*Primary Examiner* — Quyen P Leung
*Assistant Examiner* — Minki Chang
(74) *Attorney, Agent, or Firm* — Schmeiser, Olsen & Watts LLP

(57) ABSTRACT

Provided is an electric generator including a stator including:
a stator yoke
a plurality of teeth,
a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end. The stator further includes a plurality of coils housed in the plurality of slots, each
(Continued)

slot housing at least one coil in the bottom portion and at least another coil in the top portion, each coil housed in the bottom portion of a first slot of the plurality of slots being connected to another respective coil housed in the top portion of a second slot of the plurality of slots.

17 Claims, 5 Drawing Sheets

(51) Int. Cl.
*H02K 15/02* (2006.01)
*H02K 1/2791* (2022.01)
*H02K 7/18* (2006.01)

(56) References Cited

U.S. PATENT DOCUMENTS

2015/0084454 A1* 3/2015 Noer .................. H02K 1/148
                                                        310/58
2020/0373812 A1* 11/2020 Li ........................ F03D 1/04

OTHER PUBLICATIONS

International Search Report dated May 8, 2019 for Application No. PCT/EP2019/058345.

* cited by examiner

COIL FORMATION IN AN ELECTRIC MACHINE WITH CONCENTRATED WINDINGS

CROSS-REFERENCE TO RELATED APPLICATIONS

This application claims priority to PCT Application No. PCT/EP2019/058345, having a filing date of Apr. 3, 2019, which is based off of EP Application No. 18167999.4, having a filing date of Apr. 18, 2018, the entire contents both of which are hereby incorporated by reference.

FIELD OF TECHNOLOGY

The following relates to an electric machine with concentrated windings having a coil geometry permitting an increase of the fill factor, i.e. the ratio between the winding which is made of a good conducting material and the volume needed to house the winding.

The following may be particularly, but not exclusively, applied to the electric generator of a wind turbine.

BACKGROUND

An electrical machine, such as an electric generator installed in a wind turbine, typically comprises a rotor which rotates relative to a stator.

The stator normally comprises a frame body longitudinally extending along a longitudinal axis and including a stator yoke and a plurality of teeth protruding according to a radial direction from the stator yoke to respective tooth radial ends. Each tooth extends also longitudinally between a first tooth longitudinal end and a second tooth longitudinal end. In the stator a plurality of slots are also defined, each slot being delimited circumferentially by two adjacent teeth and radially extending between the stator yoke and the respective tooth radial ends. Each slot houses a respective winding.

Embodiments of the present invention relate to concentrated windings, where each winding in each slot comprises a plurality of coils, each coil being connected with a respective coil of an adjacent slot through a respective end-winding, as shown in the attached FIGS. 5 and 6.

Preformed coils may be used, where the end winding is designed to be long enough to allow the respective coil to be deformed in order to allow the insertion in the respective slots.

With reference to the schematic sections of FIGS. 5 and 6, each winding 17 in each slot 16 comprises two coils 19, respectively belonging to two phases of the electric generator and both extending along the entire radial depth of the respective slot 16. Each tooth 18 separates a pair of adjacent coils 19 housed in two respective adjacent slots 16, belonging to the same phase and connected by a respective end-winding 21.

In the embodiment of FIG. 5, the slots 16 are rectangular in shape and the teeth 18 are consequently tapered. In such design the double layer winding layout makes it difficult to insert coils with narrow coil width for side by side coil formation. In this case, it is necessary to have a longer coil overhang length of the end-windings to be able to make the coil insertion possible in the slot. Also, there is a possibility to damage the coil insulation during coil insertion process.

In the solution of FIG. 6, the teeth 18 are rectangular in shape and the slots 16 are consequently V-shaped. This design eases the coil insertion with shorter coil overhang length but it reduces performance of the machine as active material of tooth is replaced by non-active insulation material 16a in the middle of each slot, between the coils.

It is therefore desirable to provide a new concentrated winding design, in order to overcome or reduce the inconveniences above described.

SUMMARY

An aspect relates to providing an electric generator having a stator geometry permitting to avoid the above described inconveniences, by optimally reducing the coil overhang length, at the same time without compromising the performances of the electric generator.

According to a first aspect of embodiments of the invention, it is provided an electric machine comprising a stator including:
  a stator yoke longitudinally extending along a longitudinal axis of the stator,
  a plurality of teeth protruding according to a radial direction orthogonal to the longitudinal axis) from the stator yoke to respective radial tooth ends,
  a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end,
  a plurality of coils housed in the plurality of slots, each slot housing at least one coil in the bottom portion and at least another coil in the top portion,
wherein each coil housed in the bottom portion of a first slot of the plurality of slots is connected to another respective coil housed in the top portion of a second slot of the plurality of slots.

The above described electric generator or motor may be advantageously integrated in a wind turbine.

According to a second aspect of embodiments of the invention, it is provided a method of manufacturing an electric machine comprising the step of:
  providing a stator having a stator yoke longitudinally extending along a longitudinal axis of the stator, a plurality of teeth protruding according to a radial direction orthogonal to the longitudinal axis from the stator yoke to respective radial tooth ends and a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end,
  providing a plurality of coils housed in the plurality of slots, each slot housing at least one coil in the bottom portion and at least another coil in the top portion,
  connecting each coil housed in the bottom portion of a first slot of the plurality of slots to another respective coil housed in the top portion of a second slot of the plurality of slots.

Advantageously, the stator geometry, and in particular the coil configuration, achieves the scope above defined. Further, embodiments of the present invention allow easy insertion of coils in the slot without damaging insulation of the coil and increases the fill-factor of conducting material in the slot compared to the conventional options. When manufacturing preformed concentrated winding stator coils for the electric machine of embodiments of the present invention, the process of auto-mated-taping may be with relative greater ease, in comparison to the above described conventional options, due to the wider aperture of the coil after the coil winding phases.

According to an embodiment of the invention, the second slot of the plurality of slots is adjacent to the first slot, the first slot and the second slot being separated by one interposed tooth of the plurality of teeth.

According to another possible embodiment of the invention, each slot houses at least two coils in the bottom portion and two other coils in the top portion.

In particular, the coils may be connected such that the coil in the bottom portion which is more distanced from the interposed tooth is respectively connected to the coil in the top portion which is adjacent to the interposed tooth and that the coil in the bottom portion which is adjacent to the interposed tooth is respectively connected to the coil in the top portion which is more remote from the interposed tooth.

According to an embodiment of the invention, all the coils in the bottom portion belongs to a first electrical phase of the electric generator and all the coils in the top portion belongs to a second electrical phase of the electric generator. This avoids the need of insulation between coils of the same phase.

In embodiment with a segmented stator, i.e. wherein the stator comprises a plurality of segments, each segment may comprise two slots at the respective circumferential ends, each slot housing at least one coil in one of the bottom portion and the top portion the other of the bottom portion and the top portion being free of coils.

In such embodiment, a support may be provided at the respective circumferential ends of each stator segment, for filling any of the bottom portion or the top portion being free of coils during transportation.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
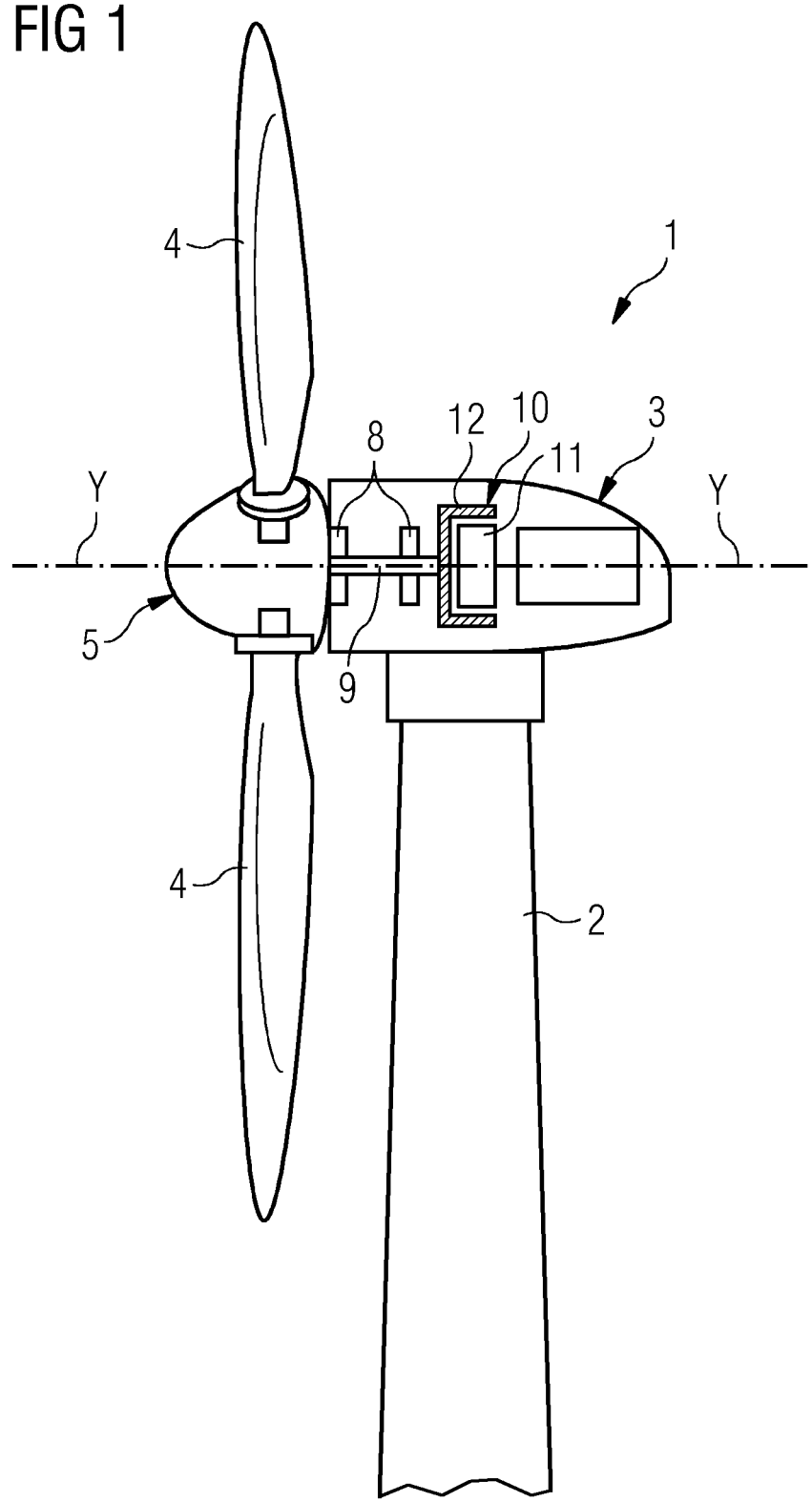
FIG. 1 shows a schematic section of a wind turbine including an electric generator with stator geometry according to embodiments the present invention.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y.

The wind turbine 1 comprises a concentrated winding electric generator 10.

The wind rotor 5 is rotationally coupled with the electric generator 10 by means of a rotatable main shaft 9.

According to other possible embodiments of the present invention (not represented in the attached figures), the wind rotor 5 is rotationally coupled directly with the electric generator 10 (direct-drive generator configuration).

A schematically depicted bearing assembly 8 is provided in order to hold in place the rotor 5. The rotatable main shaft 9 extends along the rotational axis Y. The permanent magnet electric generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator 11.

According to other possible embodiments of the present invention (not represented in the attached figures), embodiments of the present invention can be applied to any electrical generator or motor which has concentrated winding topology, for example geared drive-trains or electrical machine of the synchronous or asynchronous types.

Figure 2:
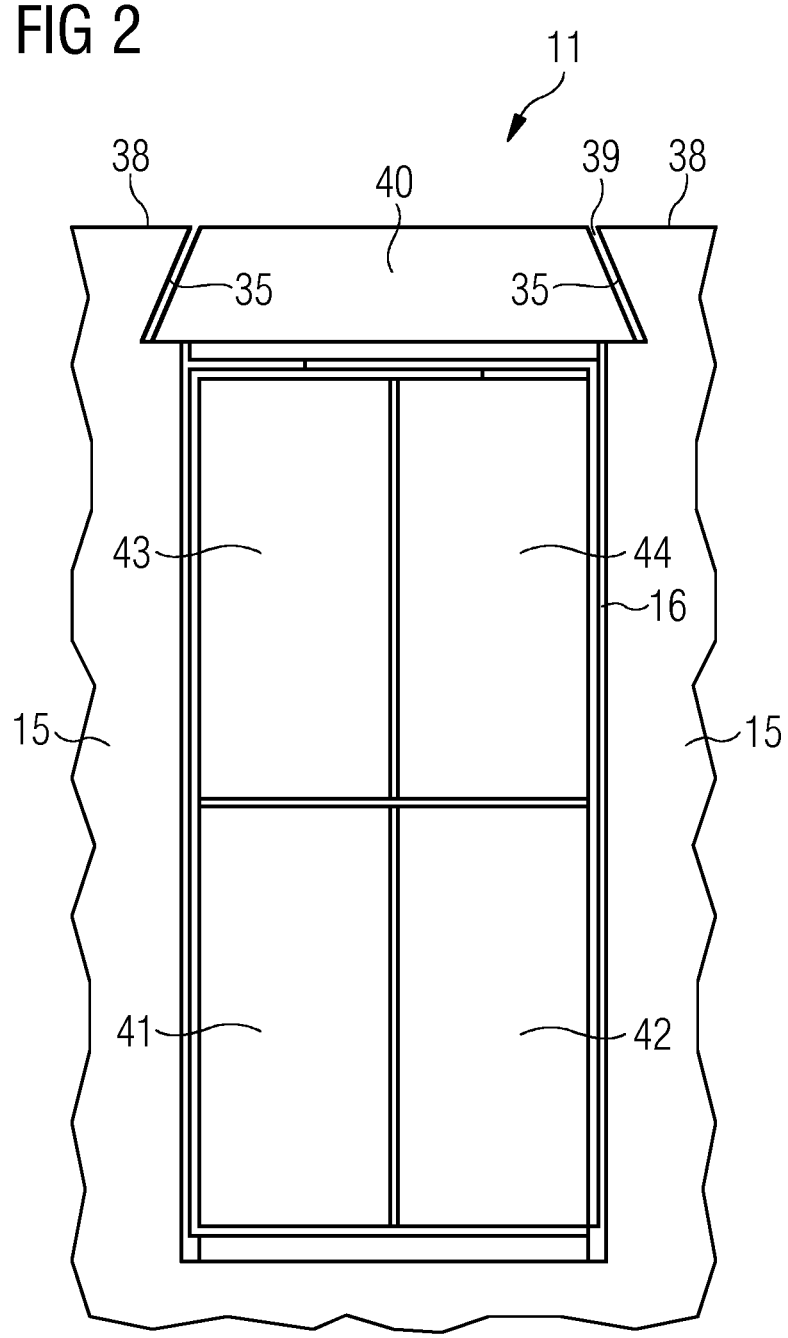
FIG. 2 shows a cross section of a slot of a stator of an electric generator in accordance with embodiments of the present invention.

FIG. 2 shows a partial schematic view of a cross section, orthogonal to the rotational axis Y, of one embodiment of the stator 11.

The stator includes a stator yoke 22 (only partially represented in the attached figures) longitudinally extending along the longitudinal axis of the stator, from which a plurality of teeth 15 (only two teeth 15 are partially represented in the attached FIG. 2) protrude according to a radial direction up to respective radial tooth ends 38.

The stator includes also a plurality of slots 16, 17 (one slot 16 is shown in FIG. 2) extending radially from the stator yoke 22 to respective radial slot ends 39.

The plurality of slots 16, 17 are circumferentially interposed between the teeth 15 of the stator 11.

Each slot 16, 17 houses a respective concentrated winding and a wedge 40. The wedges 40 are provided at radial slot ends 39 for protecting and keeping in place the respective windings.

The concentrated windings comprise a plurality of coils 41, 42, 43, 44, as better detailed in the following.

At each slot end 39 a respective wedge 40 is provided for radially closing the respective slot 16, 17. Each wedge 40 circumferentially extends in the respective slot 16, 17 between two notches 35 respectively provided at the radial tooth ends 38 of the two teeth 15 which circumferentially delimit the respective slot 16, 17.

The slot 16 includes a bottom portion 16a adjacent to the stator yoke 22 and a top portion 16b adjacent to the respective radial slot end 39.

The slot 16 includes two coils 41, 42 in the bottom portion 16a, both belonging to a first phase A of the electric generator 11, and two coils 43, 44 in the top portion 16b, both belonging to a second phase B of the electric generator 11.

Figure 3:
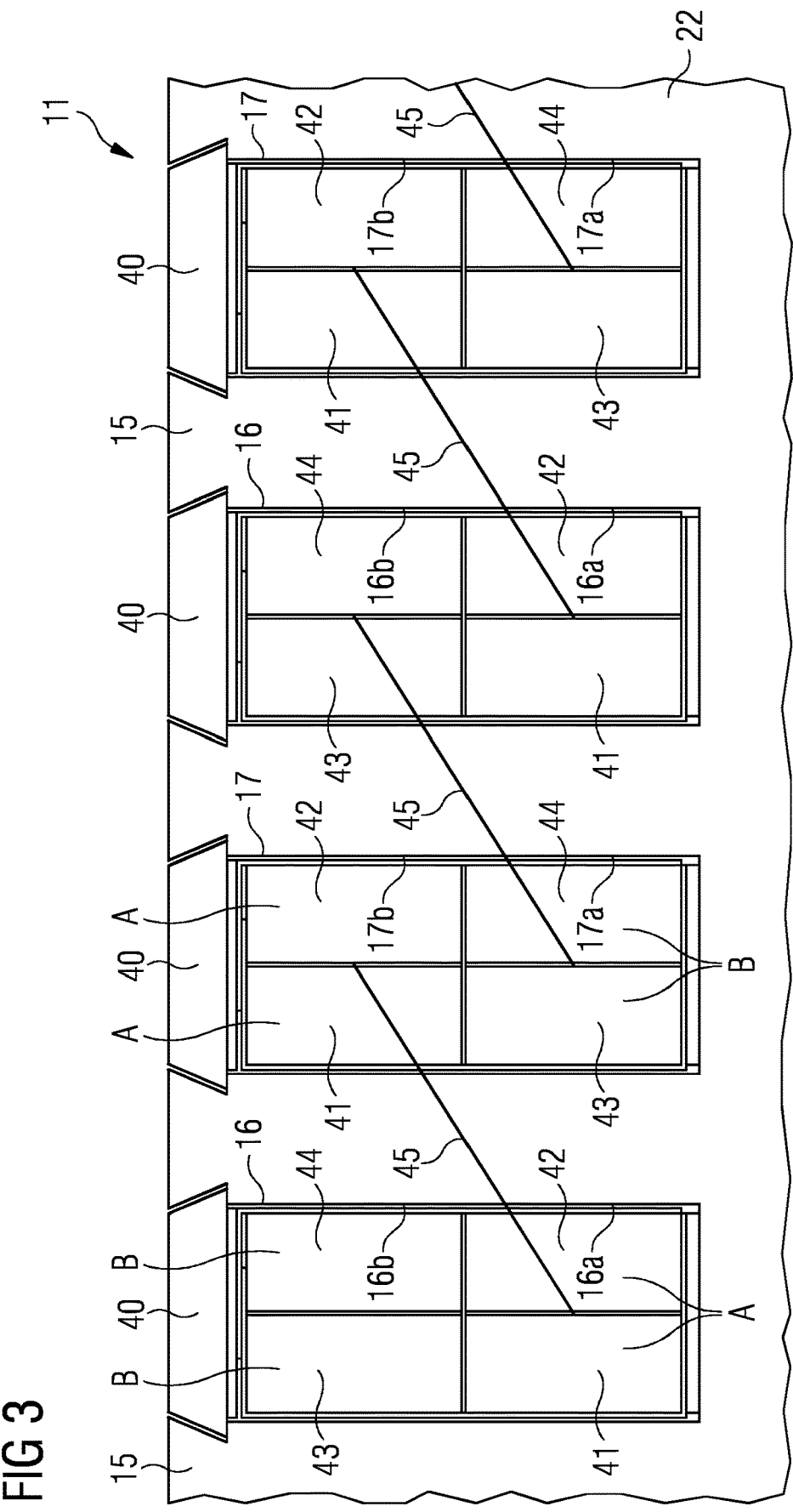
FIG. 3 shows a partial cross section of a stator of an electric generator in accordance with embodiments of the present invention.

With reference to FIG. 3, two pair of adjacent slots 16, 17 are shown. Each pair of slots 16, 17 include a first slot 16 (as in FIG. 2) and a second slot 17, separated from the first slot 16 by an interposed tooth 15 of the plurality of teeth 15.

Similarly to the first slot 16, the second slot 17 includes also a bottom portion 17a adjacent to the stator yoke 22 and a top portion 17b adjacent to the respective radial slot end 39.

Differently from the first slot 16, the second slot 17 includes the two coils 41, 42 of the first phase in the top portion 17b and the two coils 43, 44 of the second phase B in the bottom portion 17a.

Each coil 41, 42 housed in the bottom portion 16a of the first slot 16 is connected to another respective coil 41, 42 housed in the top portion 17b of the second slot 17 by means of a respective end-windings 45.

Conversely, each coil 43, 44 housed in the bottom portion 17a of the second slot 17 is connected to another respective coil 43, 44 housed in the top portion 16b of the first slot 16 by means of a respective end-windings 45.

The representation of end-windings 45 in the cross section of FIG. 3 is schematic. In reality the end-windings 45 has a curved shape protruding axially in air from the slots 16, 17.

As shown in the embodiment of FIG. 3, the coils 41, 42, 43, 44 are connected such that the coil 41, 43 in the bottom portion 16a, 17a which is more distanced from the tooth 15 interposed between the slots 16, 17 is respectively connected to the coil 41, 43 in the top portion 17b, 16b which is adjacent to the interposed tooth 15 and that the coil 42, 44 in the bottom portion 16a, 17a which is adjacent to the interposed tooth 15 is respectively connected to the coil 42, 44 in the top portion 17b, 16b which is more remote from the interposed tooth 15. Such form of connection limits the overhang of the end-windings 45.

Figure 4:
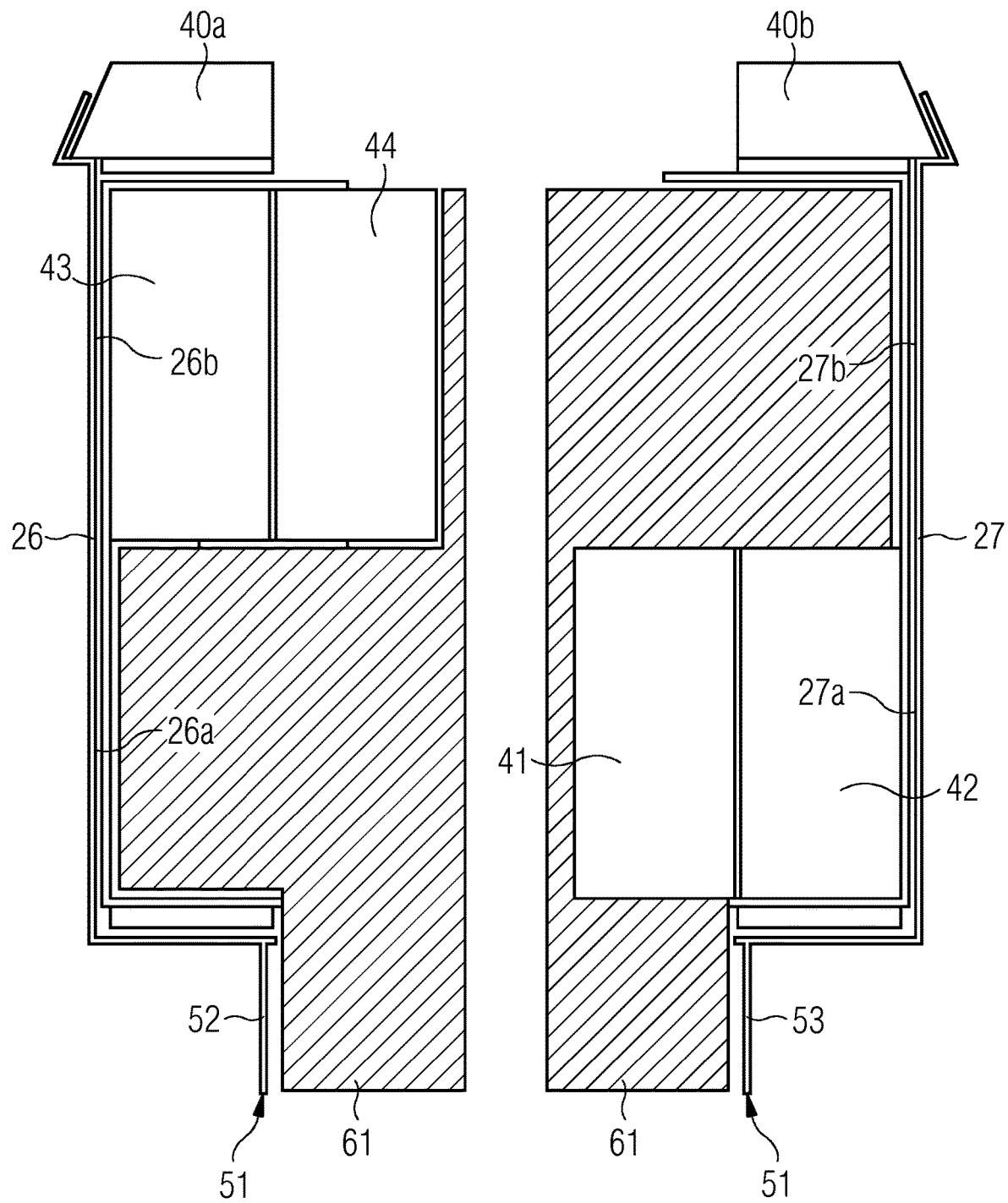
FIG. 4 shows partial cross section of another embodiment of a stator of an electric generator in accordance with embodiments of the present invention.
Figure 5:
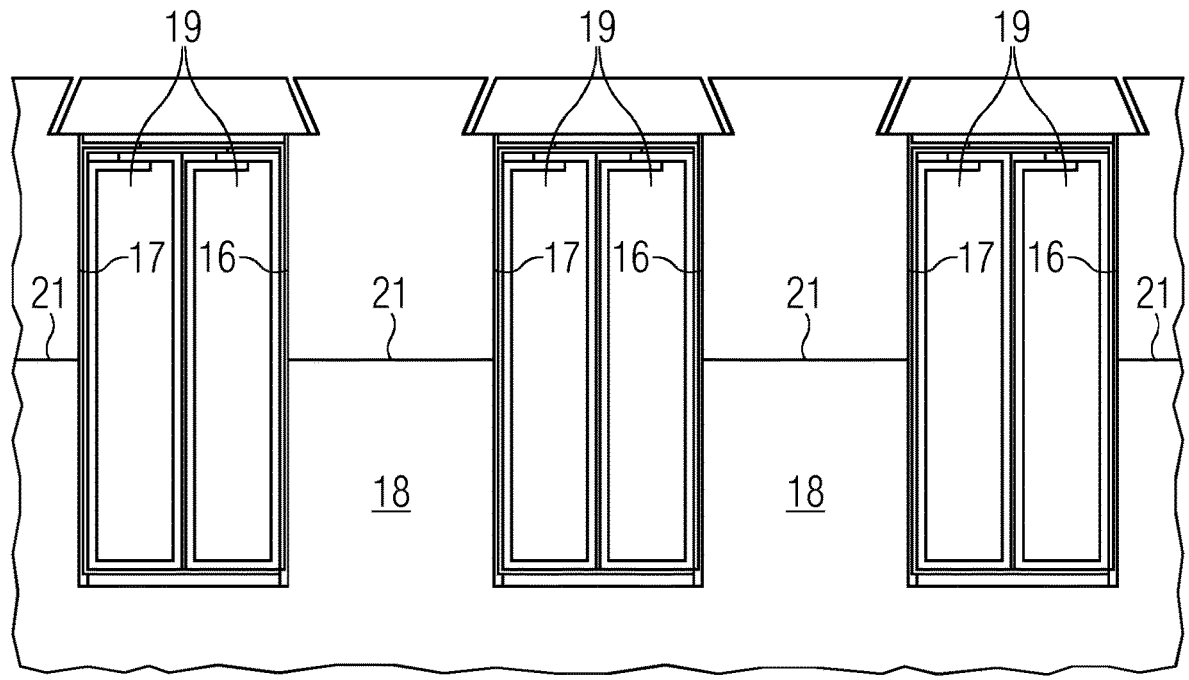
FIG. 5 shows a partial cross section of a stator of an electric generator in accordance with the prior art.
Figure 6:
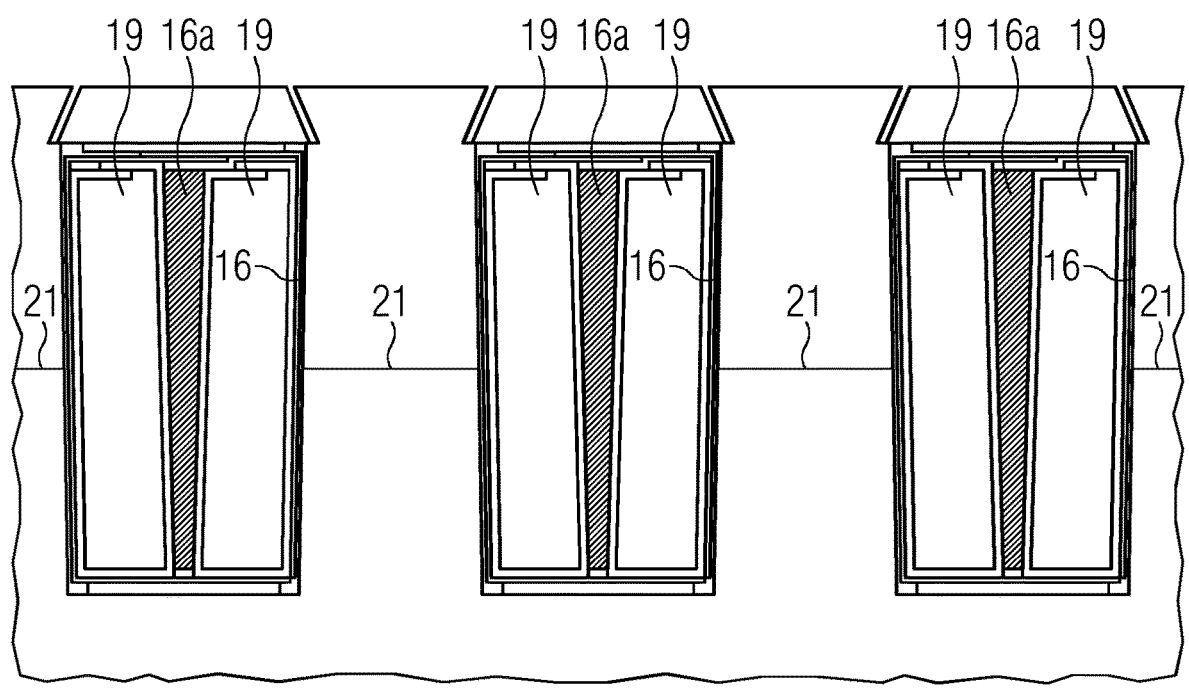
FIG. 6 shows a partial cross section of another stator of an electric generator in accordance with the prior art.

FIG. 4 shows a partial schematic view of a cross section, orthogonal to the rotational axis Y, of another embodiment of the stator 11, where the stator 11 is segmented and comprises a plurality of segments 51. Each segment 51 comprises one first end slot 26 at one circumferential end 52 and a second end slot 27 at the other circumferential end 53.

Each end slot 26, 27 has a circumferential extension corresponding to half the circumferential extension of each of the plurality of slots 16, 17 of the stator 11, in such a way that, when two segments 51 are circumferentially joined together, a slot 16, 17 of the stator 11 is formed.

To such purpose, the coils 41, 42, 43, 44 are already formed and inserted in the end slot 26, 27, in such a way that, when two segments 51 are circumferentially joined together a slot 16, 17 of the stator 11 is formed with the respective coils 41, 42, 43, 44 already included therein.

Each of the end slots 26, 27 comprises respective bottom portions 26a, 27a adjacent to the stator yoke 22 and top portions 26b, 27b adjacent to the respective radial slot end 39.

Respective half wedges 40a, 40b are provided at each end slot 26, 27, in such a way that, when two segments 51 are circumferentially joined together, a wedge 40 of the stator 11 is formed.

In general, in a segmented stator 11, each end slot 26, 27 houses at least one coil 41, 42, 43, 44 in one of the bottom portion 26a, 27a and the top portion 26b, 27b the other of the bottom portion 26a, 27a and the top portion 26b, 27b being free of coils.

The embodiment of FIG. 4 shows when the two segments 51 are circumferentially joined together a first slot 16 (as in FIG. 2) is formed. Therefore in one bottom portion 27a of the end slot 27, both coils 41, 42 of the first phase A are provided while the respective top portion 27b is left free of coils and in the one top portion 26b of the other end slot 26, both coils 43, 44 of the second phase B are provided while the respective bottom portion 26a is left free of coils.

The manufacturing of the two segments 51 and the subsequent assembly in an electrical machine, e.g. the electric generator 10, results in a balanced magnetic inductance in all of the plurality of coils (41, 42, 43, 44).

When manufacturing the stator 11, a support 61 at each circumferential end 52, 53 of the segment 51 of the stator 11 for filling any of the bottom portion 26a, 27a or the top portion 26b, 27b being free of coils. This is useful during storing and transportation of the segment 51.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electric machine comprising a stator including:
   a stator yoke longitudinally extending along a longitudinal axis of the stator,
   a plurality of teeth protruding according to a radial direction orthogonal to the longitudinal axis from the stator yoke to respective radial tooth ends,
   a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end,
   a plurality of coils housed in the plurality of slots, each slot housing at least one coil in the bottom portion and at least another coil in the top portion,
   wherein each respective coil housed in the bottom portion of a first slot of the plurality of slots is connected to another respective coil housed in the top portion of a second slot of the plurality of slots,
   wherein the second slot of the plurality of slots is adjacent to the first slot, the first slot and the second slot being separated by one interposed tooth of the plurality of teeth, and
   wherein the coils are connected such that the coil in the bottom portion which is more distanced from the interposed tooth is respectively connected to the coil in the top portion which is adjacent to the interposed tooth and that the coil in the bottom portion which is adjacent to the interposed tooth is respectively connected to the coil in the top portion which is more remote from the interposed tooth.

2. The electric machine as claimed in claim 1, wherein each slot houses at least two coils in the bottom portion and two other coils in the top portion.

3. The electric machine as claimed in claim 2, wherein all the coils in the bottom portion of a respective slot belong to a first electrical phase of the electric generator and all the coils in the top portion of the respective slot belong to a second electrical phase of the electric generator.

4. The electric machine as claimed in claim 1, wherein the stator comprises a plurality of segments, each segment comprising two end slots at respective circumferential ends, each end slot having a circumferential extension corresponding to half a circumferential extension of each of the plurality of slots of the stator, each end slot housing at least one coil in one of the bottom portion and the top portion, wherein the other of the bottom portion and the top portion is free of coils.

5. A method of manufacturing an electric machine comprising:
- providing a stator having a stator yoke longitudinally extending along a longitudinal axis of the stator, a plurality of teeth protruding according to a radial direction orthogonal to the longitudinal axis from the stator yoke to respective radial tooth ends and a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end,
- providing a plurality of coils housed in the plurality of slots, each slot housing at least one coil in the bottom portion and at least another coil in the top portion,
- connecting each coil housed in the bottom portion of a first slot of the plurality of slots to another respective coil housed in the top portion of a second slot of the plurality of slots,
- wherein the second slot of the plurality of slots is adjacent to the first slot, the first slot and the second slot being separated by one interposed tooth of the plurality of teeth, and the coils are connected such that the coil in the bottom portion which is more distanced from the interposed tooth is respectively connected to the coil in the top portion which is adjacent to the interposed tooth and that the coil in the bottom portion which is adjacent to the interposed tooth is respectively connected to the coil in the top portion which is more remote from the interposed tooth.

6. The method of manufacturing as claimed in claim 5, wherein the stator is manufactured as a plurality of segments, each segment comprising two end slots at respective circumferential ends, each end slot having a circumferential extension corresponding to half a circumferential extension of each of the plurality of slots of the stator, the method comprising:
- providing in each slot at least one coil in one of the bottom portion and the top portion, wherein the other of the bottom portion and the top portion is free of coils.

7. The method of manufacturing as claimed in claim 6, wherein the method further comprises forming a slot of the plurality of slots of the stator, the formed slot housing a plurality of coils, by circumferentially joining two segments.

8. The method of manufacturing as claimed in claim 6, the method further comprising the step of providing at least a support at a respective circumferential end of one of the segments of the stator for filling any of the bottom portion or the top portion which is free of coils during transportation.

9. An electric machine comprising a stator including:
- a stator yoke longitudinally extending along a longitudinal axis of the stator,
- a plurality of teeth protruding according to a radial direction orthogonal to the longitudinal axis from the stator yoke to respective radial tooth ends,
- a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end,
- a plurality of coils housed in the plurality of slots, each slot housing at least one coil in the bottom portion and at least another coil in the top portion,
- wherein each respective coil housed in the bottom portion of a first slot of the plurality of slots is connected to another respective coil housed in the top portion of a second slot of the plurality of slots,
- wherein the stator comprises a plurality of segments, each segment comprising two end slots at respective circumferential ends, each end slot having a circumferential extension corresponding to half a circumferential extension of each of the plurality of slots of the stator, each end slot housing at least one coil in one of the bottom portion and the top portion, wherein the other of the bottom portion and the top portion is free of coils, wherein two circumferentially adjacent segments are joined together to form a full slot.

10. The electric machine as claimed in claim 9, wherein the second slot of the plurality of slots is adjacent to the first slot, the first slot and the second slot being separated by one interposed tooth of the plurality of teeth.

11. The electric machine as claimed in claim 10, wherein the coils are connected such that the coil in the bottom portion which is more distanced from the interposed tooth is respectively connected to the coil in the top portion which is adjacent to the interposed tooth and that the coil in the bottom portion which is adjacent to the interposed tooth is respectively connected to the coil in the top portion which is more remote from the interposed tooth.

12. The electric machine as claimed in claim 9, wherein each slot houses at least two coils in the bottom portion and two other coils in the top portion.

13. The electric machine as claimed in claim 12, wherein all the coils in the bottom portion of a respective slot belong to a first electrical phase of the electric generator and all the coils in the top portion of the respective slot belong to a second electrical phase of the electric generator.

14. A method of manufacturing a stator for an electric machine comprising:
- providing a stator having a stator yoke longitudinally extending along a longitudinal axis of the stator, a plurality of teeth protruding according to a radial direction orthogonal to the longitudinal axis from the stator yoke to respective radial tooth ends and a plurality of slots extending radially from the stator yoke to respective radial slot ends, the plurality of slots being circumferentially interposed between the teeth of the stator, each slot including a bottom portion adjacent to the stator yoke and a top portion adjacent to the respective radial slot end, the stator comprising a plurality of segments, each segment comprising a first end slot and a second end slot at two respective circumferential ends, each end slot having a circumferential extension corresponding to half a circumferential extension of each of the plurality of slots of the stator,
- providing a plurality of coils housed in the plurality of slots, each slot housing at least one coil in the bottom portion and at least another coil in the top portion, each end slot housing at least one coil in one of the bottom portion and the top portion, the other of the bottom portion and the top portion being free of coils, connecting each coil housed in the bottom portion of a first slot of the plurality of slots to another respective coil housed in the top portion of a second slot of the plurality of slots, and circumferentially joining together the plurality of segments such that when two adjacent segments are joined together, the slots of the stator are formed.

15. The method of manufacturing as claimed in claim 14, wherein the stator is manufactured as a plurality of segments, each segment comprising two end slots at respective circumferential ends, each end slot having a circumferential extension corresponding to half a circumferential extension of each of the plurality of slots of the stator, the method comprising:

providing in each slot at least one coil in one of the bottom portion and the top portion, wherein the other of the bottom portion and the top portion is free of coils.

16. The method of manufacturing as claimed in claim 15, wherein the method further comprises forming a slot of the plurality of slots of the stator, the formed slot housing a plurality of coils, by circumferentially joining two segments.

17. The method of manufacturing as claimed in claim 15, the method further comprising the step of providing at least a support at a respective circumferential end of one of the segments of the stator for filling any of the bottom portion or the top portion which is free of coils during transportation.

* * * * *